United States Patent Office 3,272,639
Patented Sept. 13, 1966

3,272,639
TREATMENT OF PROTEINACEOUS MATERIALS
WITH PEROXYDISULFATE SALTS
Donald H. Slocum, Wilmington, Del., assignor to The Procter & Gamble Company, Cincinnati, Ohio, a corporation of Ohio
No Drawing. Filed Jan. 2, 1963, Ser. No. 248,896
8 Claims. (Cl. 106—125)

This invention relates to the treatment of proteinaceous material, and more particularly, it relates to a method for chemically converting proteinaceous materials which do not normally gel under the influence of heat into materials which will produce irreversible gels under the influence of heat, and the products obtained thereby.

Proteins which form irreversible gels under the influence of heat are well known in the art. One of the most common of these is egg albumen, which when heated forms a gel which persists at normal room temperature and which is not further affected by thermal treatment, provided that the temperature is not sufficiently high to destroy the structure or burn the gel. Also well known are examples of gels which are reversible; that is, form a sol, when they are heated to a high temperature. Familiar examples of this class of materials are gelatin and pectin. Each of these substances can be used to produce a sol at high temperatures and the resultant sol will form a gel when the temperature is permitted to fall to, say, room temperature. It is recognized that of these two examples of reversible gel formation only gelatin is proteinaceous, pectin being a carbohydrate substance.

An irreversible heat-gelable substance like albumen is relatively expensive, but because of its desirable properties it is used both in prepared edible products, such as cakes and the like, and in inedible products, such as tempera paints. Albumen has disadvantages other than cost. Being a product which is obtained in small increments of single eggs from a large number of individual fowl, it is a highly variable substance. Secondly, it is difficult to handle in a large-scale operation. Many eggs must be broken open and the yolk separated from the albumen in order to obtain large quantities. Thirdly, it has poor keeping qualities unless somehow treated to preserve it. Thus, large quantities of albumen are frozen for later use, while another portion of the supply of albumen is dried by one means or another to arrest degradation due to oxidative or microbiological action. The former process is expensive and results in a bulky product which contains large quantities of water, such water having no real utility so far as the albumen goes and resulting in high shipping costs. The latter of these processes saves on space and shipping cost by removing the water, but it is difficult to retain the desirable properties of the albumen during the drying operation, and this drying introduces a further variable into this proteinaceous material.

It is an object of this invention to provide a method for producing irreversibly heat-gelable protein materials economically.

A further object of this invention is the utilization of proteinaceous materials which would otherwise have considerably less utility, and hence less value.

Another object is the production of irreversibly heat-gelable protein materials with uniform, controlled properties.

It is a further object of the instant invention to provide a culinary material which can easily be incorporated into prepared mixes to produce a more uniform and stable product. Still another object of the process to be described is the provision of a new class of materials which can be used to gel or thicken aqueous systems.

This invention has also for one of its objects the provision of a new material which can be used as a water-insoluble cement.

Many other and further objects of and benefits which flow from this invention will be readily apparent to those skilled in the art after they have read and become familiar with this disclosure.

All designation of the quantities of materials herein specified, whether these quantities are given in parts or percentages, shall be by weight, unless specifically otherwise designated.

A composition of matter has been discovered which will gel irreversibly when it is subject to elevated temperatures, despite the fact that none of the starting materials by themselves would form an irreversible gel upon heating, or upon any other treatment. This composition consists essentially of an aqueous medium constaining (1) a colloidal dispersion of a non-heat-gelable protein and (2) peroxydisulfate anion in amounts appreciably less than the amount of protein, namely, on the order of from about 0.035 to about 0.40 part of anion for each part of protein. Such a composition has utility as a component of a cake mix, to name a culinary use, or as a glue, to illustrate a non-food use.

This invention also makes possible a method of using a non-heat-gelable protein to form an irreversible gel. Briefly, the method comprises the steps of combining in an aqueous medium (1) a colloidal dispersion of a non-heat-gelable protein and (2) peroxydisulfate anion in an amount substantially less than the amount of protein, namely, on the order of from about 0.035 to about 0.40 part of anion for each part of protein; and heating the protein- and anion-containing medium to a temperature in the range of from about 60° C. to about 150° C.

Before describing the compositions and process of this invention in greater detail, attention is directed toward the term "protein." A proteinaceous substance, or more simply for the purposes of this description, a protein, is a complex chemical entity. As used herein, a protein is a polymeric substance which results from the condensation of a large number of α-amino acids. Proteins range in molecular weight from a low, for example insulin with a molecular weight of about 6,000, up to substances such as, for example, wheat glutenin with a molecular weight of several million.

A gel is defined as a jelly-like substance, that is, a soft, rather elastic solid material without great tensile or shear strength. In terms of physical chemistry a gel is considered to be a solidified colloidal "solution," or sol. One cannot truly speak of a colloid in "solution" since there are significant differences in behavior between true solutions and sols.

The proteinaceous materials of the compositions produced by the method of this invention form heat-set gels which are irreversible. An irreversible heat-set gel is a gel formed when a sol solidifies when its temperature is raised to some specified value. It is said to be irreversible because when it is cooled back to the temperature at which the sol formerly existed, the gel still persists, rather than melting back into the sol again. Hereinafter, a material which will form a heat-set gel will be referred to as a "heat-gelable" material.

The behavior of an irreversible heat-gelable material is exemplified by albumen, as mentioned above. As the temperature is raised to, say, 100° C. the albumen becomes increasingly stiffer and finally forms a solid which will retain its shape—rather than a liquid which will flow to occupy the available space insofar as possible. It is heat-set because the gelation takes place under the influence of high temperature, and it is irreversible because, upon cooling to room temperature or any temperature below the baking temperature, it continues to remain in a solid, jelly-like mass. Contrasted with this is the behavior of ordinary gelatin which will form a sol when heated to a temperature of, for example, 70° C. and will then set to a gel as the temperature is lowered substantially below this point. If a gelatin gel is again heated to the higher temperature, it will melt and reform the sol from which it originated.

It should be pointed out that the gels formed by the method of this invention are irreversible, but that should not be taken to mean that they will last indefinitely under high temperature conditions, nor that the temperature may be raised to a very high value. Obviously, since the protein materials contemplated by this invention are organic, they will decompose into more elemental substances if the temperature is sufficiently high. Further, it has been found that under certain conditions, described more fully below, maintaining the heat-set gel at an elevated temperature will cause destruction of the gel and formation of a fluid or semi-fluid substance, where the pH is much below 2 or above 12. This is not to be taken as an indication of lack of irreversible gel formation, but rather as destruction of the irreversible gel by a harsh environment.

To achieve the results of this method it is necessary that the protein be dispersible in a colloidal form in an aqueous medium. As discussed above, a colloid is not a true solution, but it is rather a state of very fine division, generally considered to be that state in which the particles range in diameter from about 0.005 to about 0.2 micron.

Many proteins are in such a condition that they will not form a sol in an aqueous medium. For the purposes of this method, a protein need not in its pristine form be dispersible as a colloid in an aqueous medium, so long as it can be chemically or physically treated to produce a colloidal dispersion. This treatment of proteins is called "solubilization" for the purposes of this method. Methods of solubilizing proteins are well known to those versed in the art. For instance, the techniques of hydrolysis, sulfation, or phosphorylation may be used. Some of these techniques are used below in exemplifying specific embodiments of this invention.

The method of the instant invention appears to be applicable to any non-heat-gelable protein which can be solubilized in an aqueous system. Exemplary of the wide range of non-heat-gelable proteins, both isolated and crude, which are responsive to the method of the instant invention are gelatin, casein, gliadin and modified forms thereof such as deamidated gliadin, phosvitin, pepsin, trypsin, chymotrypsin, zein, hordein, cottonseed globulin, peanut globulin, papain, barley $\beta$-globulin, legumin, vicilin, arachin, conarchin, ovomucoid, collagen, elastin, and soya proteins. The foregoing list is not exclusive or exhaustive and many other isolated or pure non-heat-gelable proteins, including enzymes, or impure proteins are responsive to the method herein disclosed.

The strength of the heat-set gel and the time required for the heat-treatment vary with the amount of peroxydisulfate anion, as discussed hereinafter, and with the concentration of protein in the solution. While very small amounts of protein can be used to thicken aqueous media, it is generally preferred to use a minimum protein concentration in the aqueous medium of about three percent. The upper limit of protein concentration which can be used is determined by the amount of the particular protein which may be dispersed in the aqueous medium. If a greater protein concentration is desired the protein can be subjected to solubilization, or greater solubilization, by the methods disclosed above.

The agent which renders colloidally dispersed proteins capable of forming an irreversible heat-set gel is peroxydisulfuric acid anion. There has been a tendency in the art to call salts of this acid "persulfates" and to call the acid itself "persulfuric acid," but the existence of two acids to which this term can apply, namely, peroxymonosulfuric acid (also called Caro's acid) and peroxydisulfuric acid, makes it imperative that it is the peroxydisulfate anion ($S_2O_8^=$) which is understood as being used in the practice of this invention.

The presence of a certain concentration of peroxydisulfate anion is required in order to render the treated protein heat-gelable. The more soluble, and hence the more conveniently used, salts of peroxydisulfuric acid are the alkali-metal salts, such as those of lithium, sodium, and potassium, and the very soluble ammonium salt. Other water-soluble salts can also be used as the source of peroxydisulfate anions for the purposes of this invention. The anion can also be obtained from peroxydisulfuric acid, but this is not the peroxydisulfate anion source of choice due to the corrosive nature of the acid, its high oxidation potential, and instability. The salts, as mentioned above, are a far more convenient, more easily stored, and less hazardous source of peroxydisulfate anion.

The amount of peroxydisulfate anion necessary in the practice of the method and production of the product of this invention is considerably less than the weight of the protein present. It has been found that an amount of peroxydisulfate anion equal to or in excess of about 0.035 times the weight of protein can be used to render the protein irreversibly heat-gelable. In general, the gel strength of the treated protein increases with the amount of peroxydisulfate anion used. The type, pretreatment, and properties of the protein treated by this method will, of course, also influence the gel strength. For many proteins the minimum required for gelation is 0.035 part of peroxydisulfate anion for each part of protein.

Gel strength generally increases up to a point where the protein is treated with about 0.4 part of peroxydisulfate anion. Beyond this point a decrease in gel strength is frequently obtained due to the acidic nature of the anion, unless the aqueous medium is buffered to prevent this. The range of peroxydisulfate anion generally used in the practice of this invention is from about 0.035 part to about 0.4 part of peroxydisulfate anion to each part by weight of protein.

There is a further reason for generally using no more than about 0.4 part of peroxydisulfate anion to each part of protein: It is uneconomical to utilize more anion than is necessary to produce a stable gel. In practice, this limit for gel stability is usually reached at about 0.15 part of anion for each part of protein.

While proteins form gels when treated with as little as 0.035 part of peroxydisulfate anion to each part of protein, greater gel strength and shorter subsequent heat-treatment time to obtain a gel result when an amount of peroxydisulfate anion of at least about 0.07 part is used to treat each part of protein. The preferred range of peroxydisulfate anion quantity is from about 0.07 to about 0.15 part of anion for each part of protein.

Needless to say, while the anion weight is used in determining the quantities of peroxydisulfate to be used in the practice of this method, the anion per se cannot be added to the aqueous medium. It must be added in the form of the acid or a salt thereof. It is, of course, a simple matter to determine the amount of salt or acid to be added to obtain a given quantity of anion. As an example, suppose that it is desired to treat one part by weight of protein with 0.1 part of peroxydisulfate anion and that the potassium salt is selected for use. The formula weight of peroxydisulfate anion is approximately 192; and of potassium peroxydisulfate, approximately 264. Multiplying 0.1 by (264/192) gives a product somewhat in excess of 0.137, so that 0.137 part of potassium peroxydisulfate should be used for each part of protein to produce 0.1 part of peroxydisulfate anion.

As used herein, the term "aqueous medium" is used to denote water or a composition in which water is the predominating liquid present. The materials other than water which may be present in the aqeous medium are inorangic materials, such as acids, bases, buffering substances, and salts, or organic materials. The organic materials may be organic salts such as sodium citrate, calcium lactate, and calcium propionate; carbohydrate materials such as sucrose, starch, and dextrose; lipid materials such as cottonseed oil, soybean oil, and phosphatides; surface active agents such as propylene glycol monostearate, mono- and diglycerides, and polyoxyethylene sorbitan derivatives; and complex substances such as flour, milk solids, potato solids, and other food and non-food materials. The examples which are given below will be helpful in illustrating the range of aqueous medium which may be used in the practice of this invention.

The colloidally dispersible protein and the peroxydisulfate anion may be added to the aqueous medium in any order. It is possible to disperse the protein colloidally in the aqueous medium and then to add the peroxydisulfate anion. It is equally satisfactory to dissolve the peroxydisulfate source in the water or aqueous medium and then to add colloidally-dispersible protein to the liquid. The order of addition of the two materials will be determined by the conveniences of the situation and the end product which is desired. Alternatively, they may be pre-mixed and added simultaneously.

After the protein material has been admixed with peroxydisulfate anion in an aqueous medium to form the composition as taught above, it will gel irreversibly under the influence of elevated temperatures. As is true of many chemical reactions, the rate of the reaction is sharply dependent upon the temperature at which it is carried out. Broadly, temperatures in the range of from 60° C. to about 150° C. can be used to carry out the gel formation.

The 150° C. temperature is an approximate upper limit because of the thermal instability of protein materials. As the temperature is increased beyond this, extensive breakdown of the protein material may very well occur, and the degraded protein will be incapable of forming a gel. Operating at temperatures in excess of about 100° C. requires the use of pressure vessels, and since such high temperatures, while satisfactory for the method of this invention, are unnecessary to carry it out, it will be found most convenient to restrict the heat treatment temperature to an upper limit of about 100° C. Thus, a more convenient range of temperatures in the practice of this invention is from about 60° C. to about 100° C.

Where amounts of peroxydisulfate anion in the lower range of usage hereinabove discussed are used, long periods of time are required for the gelation to take place. Also, as remarked above, the reaction rate falls off rather rapidly with a decrease in temperature. In the interest of obtaining a conveniently rapid gelation while avoiding the use of superatmospheric pressures, it is preferred to carry out the method of gelling the compositions of the instant invention at temperatures in the range of from about 90° C. to about 100° C.

In order more fully to acquaint those skilled in the art in the modes of practicing this invention, the following examples are set forth for purposes of illustration only and are not to be considered as determinative of the scope of this invention.

*Example 1*

A solution of gelatin in water was prepared by dissolving 10 g. of gelatin in 100 ml. of water. The mixture was heated to solubilize the gelatin, and the resulting solution was then cooled to a temperature in the range of 40° to 50° C., this being a temperature range in which the gelatin solution remained liquid. A portion of the solution was withdrawn, and peroxydisulfate anion (as approximately 10 mg. of sodium peroxydisulfate per 100 mg. of gelatin) in the amount of about 0.08 times the weight of the protein was added. When the solution of gelatin and peroxydisulfate anion had been heated for 3 minutes in a steam bath, a firm irreversible gel was obtained.

Potassium peroxydisulfate, lithium peroxydisulfate, ammonium peroxydisulfate, or peroxydisulfuric acid itself can be used in the foregoing example with comparable results.

*Examples II–VII*

A solution of gelatin in water was prepared as in Example I. Portions of the solution was adjusted to pH's of 3, 4, 5, and 6.5 by the appropriate addition of hydrochloric acid solution. Other portions of the gelatin solution were adjusted to pH's of 8.9 and 11 by the addition of sodium hydroxide solution. After the pH's had been adjusted, an amount of peroxydisulfate anion equivalent to about 0.08 part of anion to each part of gelatin (approximately 10 mg. of sodium peroxydisulfate for each 100 mg. of gelatin) was added. The samples were heated for from 3 to 5 minutes on a steam bath. The results are set forth in the following tabulation:

| | pH | Result |
|---|---|---|
| Example: | | |
| II | 3 | Irreversible gel. |
| III | 4 | Do. |
| IV | 5 | Do. |
| V | 6.5 | Irreversible firm gel. |
| VI | 8.9 | Do. |
| VII | 11 | Do. |

*Examples VIII–XI*

A 5% solution of gelatin in water was prepared. Varying amounts of peroxydisulfate were added to portions of the gelatin solution, as shown in the following tabulation. The samples were all heated for from 3 to 5 minutes in a steam bath. The "Ratio" column is the weight of peroxydisulfate anion added to each part of gelatin, said anion being added to the gelatin in the form of sodium peroxydisulfate. The results were as follows:

| | Ratio | Result |
|---|---|---|
| Example: | | |
| VIII | 0.08 | Irreversible clear gel. |
| IX | 0.16 | Do. |
| X | 0.24 | Irreversible turbid gel. |
| XI | 0.32 | Do. |

*Example XII*

A 5% solution of gelatin in water was prepared as in Examples VIII–XI and 0.072 part of peroxydisulfate anion were added to each part of gelatin (approximately 9 mg. of sodium peroxydisulfate for each 100 mg. of gelatin). During the course of heating for 25 minutes on a steam bath, an irreversible gel was obtained.

*Example XIII*

A solution of gelatin was obtained by dissolving 10 parts of gelatin in 100 parts of 0.1 molar NaHCO₃ solution. The resulting solution was treated with 0.24 part of peroxydisulfate anion (from sodium peroxydisulfate) to each part of protein. The peroxydisulfate-treated solution gelled irreversibly after heating for one minute on a steam bath.

Example XIV

A bicarbonate-gelatin solution was prepared as in Example XIII. Cottonseed oil was dispersed in the solution in amounts of 2% and 5% of the protein solution. To these two solutions was then added 0.08 part by weight of peroxydisulfate anion (from sodium peroxydisulfate) for each part of protein. The two solutions were heated on a steam bath for 1.5 minutes and each thereupon produced an irreversible gel.

Examples XV–XVI

To illustrate the practice of this invention with a protein other than gelatin, a partially deamidated gliadin was prepared by dissolving 25 g. of gliadin in 450 ml. of a 70% solution of ethanol. The resultant solution was warmed on a steam bath and then added to 2160 ml. of 0.05 M hydrochloric acid solution in a 5-liter round-bottom flask at steam bath temperature. The mixture was permitted to reflux on the steam bath for approximately 2 hours, was subsequently cooled, and neutralized by the addition of sodium hydroxide. The neutralized solution was dialyzed to remove the NaCl formed during neutralization, and the dialyzed product was freeze-dried.

A 10% solution of the freeze-dried deamidated gliadin so obtained was prepared by dissolving the treated gliadin in a buffer solution of 0.026 M $K_2HPO_4$ and 0.020 M $KH_2PO_4$ at a pH of 7. Amounts of peroxydisulfate anion (from sodium peroxydisulfate) per part of gliadin were then added as shown in the "Ratio" column of the following tabulation and the solutions were heated.

| | Ratio | Result |
|---|---|---|
| Blank | 0.0 | No gel. |
| Example XV | 0.08 | Irreversible clear gel. |
| Example XVI | 0.16 | Do. |

Example XVII

The freeze-dried partially deamidated gliadin as prepared in Examples XV and XVI was dispersed to form a 10% aqueous solution, and 0.08 parts of peroxydisulfate anion (from sodium peroxydisulfate) was added. This solution was maintained at 85° C. for a period of 6 minutes whereupon a weak irreversible gel was formed. When the peroxydisulfate-treated solution was maintained at 85° C. for 10 minutes, a firm irreversible gel resulted.

Examples XVIII–XX

A 10% solution of partially deamidated gliadin was prepared by dissolving the freeze-dried partially deamidated gliadin used in Examples XV and XVI in 0.1 M $NaHCO_3$. The peroxydisulfate anion was added in the form of ammonium peroxydisulfate. The peroxydisulfate anion-treated protein was heated on a steam bath. The times required for irreversible gelation of the deamidated gliadin when treated with differing weight ratios of peroxydisulfate anion (from sodium peroxydisulfate) are shown in the following data:

| | Ratio | Time |
|---|---|---|
| Example: | | |
| XVIII | 0.17 | 1 minute. |
| XIX | 0.08 | 3 minutes. |
| XX | 0.04 | 30 minutes. |

Example XXI

A 5% solution of partially deamidated gliadin in 0.1 M $NaHCO_3$ was treated with 0.17 part of peroxydisulfate anion (from ammonium peroxydisulfate) for each part of gliadin on a steam bath for 15 minutes, whereupon an irreversible gel was formed.

Example XXII

An alkali-hydrolyzed soybean globulin protein was obtained by extracting soybean meal in the form of flakes with hexane and subsequently extracting the hexane extracted flakes at room temperature with water. The aqueous slurry was centrifuged, and the supernatant liquid obtained after centrifugation was brought to a pH of 4.4 with hydrochloric acid solution. The precipitate which resulted was collected by centrifugation, dissolved in water at pH 7, and dialyzed against water. The dialyzed solution was freeze-dried to obtain soybean globulin protein. The solubility of the soybean globulin protein was enhanced by subjecting a number of aliquots to alkali-hydrolysis conditions (from 0.01 to 0.1 M NaOH at 100° C. for from 30 to 60 minutes), dialyzing the treated materials, and freeze-drying the dialyzed substances.

Ten percent solutions of the freeze-dried alkali-hydrolyzed soybean proteins were prepared by dissolving the freeze-dried material in water. Treatment of these 10% protein solutions with 0.08 part by weight of peroxydisulfate anion (from sodium peroxydisulfate) and heating for 3 minutes on a steam bath formed gels. The clarity of the gels was greater for protein preparations which had been subjected to more concentrated alkali-hydrolysis conditions.

Example XXIII

A 10% solution of alkali-hydrolyzed soybean protein was obtained by the method of Example XXII using 0.01 M NaOH and heating at 100° C. for 30 minutes. A 50% sucrose solution of the hydrolyzed material was treated with 0.12 part of peroxydisulfate anion (from sodium peroxydisulfate) to each part of protein and heated for 3 minutes in a steam bath. The solution so treated formed a soft irreversible gel.

Example XXIV

One gram of a commercially available soybean protein preparation (RC 5360, manufactured by the General Mills Company) was heated for 10 minutes at 100° C. in 10 ml. of 0.1 M NaOH. All of the protein was solubilized by this treatment. The pH of the solution was adjusted to 8 by adding the appropriate quantity of 0.025 M hydrochloric acid solution. The resulting solution was then treated with 0.08 part of peroxydisulfate anion (from sodium peroxydisulfate) for each part of protein and heated for 3 minutes at 100° C. A firm opaque irreversible gel was formed. In the absence of peroxydisulfate anion no precipitation or gelation occurred.

Example XXV

A 10% solution of phosvitin (a protein obtained from avian egg yolk) was prepared by dissolving one part by weight of the protein in a 0.026 M $KH_2PO_4$ and 0.020 M $KH_2PO_4$ buffer at pH 7. This solution was then treated with 0.08 part of peroxydisulfate anion (from sodium peroxydisulfate) to each part of protein and heated on a steam bath for 3 minutes. An irreversible gel was obtained after the foregoing treatment.

Example XXVI

A 10% solution of pepsin in water was solubilized by adding sufficient sodium hydroxide to bring the pH to 7. Peroxydisulfate anion (from sodium peroxydisulfate) in an amount of 0.08 part per part of protein was added to the solution and a clear irreversible gel was obtained after the mixture had been heated for 5 minutes on a steam bath.

Example XXVII

In order to determine whether the thermally-irreversible heat-gelable proteins produced by the present invention would retain their gelability under conditions of practical use, a simulated cake batter was prepared by admixing 107 g. of cake flour, 133 g. of sugar, 2.5 g. of salt, and 72 g. of water. These ingredients were mixed for 2 minutes at medium speed on a household mixer. Then 36 g. of water and 60 g. of a 10% solution of alkali-hydrolyzed soybean protein (Example XXIII, supra) were added and mixing was continued for an additional 2 minutes at the same speed setting on the mixer. The resultant batter was centrifuged, and the aqueous supernatant liquid was recovered.

One gram of sodium peroxydisulfate was dissolved in 100 ml. of the aqueous supernatant liquid. Ten ml. aliquots of this solution were immersed in a water bath which was heated at a rate of temperature increase of 2° to 3° C. per minute. A weak gel was observed when a sample reached 80° C. At higher temperatures, firm gels were formed.

Examples XXVIII to XXXIV illustrate the use of the irreversible gels described herein in culinary products. In each example heat is used to form the irreversible gel. While the oven or cooking temperature may be in excess of 100° C., it will be apparent that the temperature of the protein in the anion-containing aqueous medium does not exceed 100° C.

Example XXVIII

Three grams of partially deamidated gliadin was dissolved in 25 ml. of water, and the solution was adjusted to pH 7 by adding sodium hydroxide solution. Then 0.3 g. of sodium peroxydisulfate was added, and the solution was whipped at maximum speed on a commercial household mixer (Sunbeam Mixmaster). During the whipping 2 tablespoons of sugar were added as the foam developed. A thick, stable foam formed in about 4 minutes.

The resultant foam was poured into a metal dish and heated in an oven at a temperature of 375° F. The foam was stable during heating, and after cooling it shrank slightly. Inspection revealed that gelation had occurred and a foam structure comparable to that of egg albumen had been obtained.

Example XXIX

Four g. of partially deamidated gliadin and 0.4 g. of sodium peroxydisulfate were dissolved in 25 ml. of water and the pH was adjusted as in Example XXVIII. Additionally, ¼ tablespoon of wheat starch was added to the mixture. The mixture was whipped and baked as in Example XXVIII. After baking at 375° F. the foam structure was good, and the foam appeared drier than that prepared in Example XXVIII.

Example XXX

The procedure of Example XXIX was repeated with the addition of about 1 ml. of cottonseed oil to the foam. After baking the meringue, foam structure remained good, and no detrimental effect of the added cottonseed oil was observed.

Example XXXI

A foam meringue was prepared as in Example XXX and placed on a normal lemon pie. The pie was subsequently baked at 450° F. The meringue was good in structure, color, and stability and closely resembled the conventional egg white meringue.

Example XXXIII

A commercial white cake mix which required the addition of two egg-whites ("Duncan Hines Deluxe," manufactured by The Procter & Gamble Company) was used to prepare a batter, without adding the requisite egg-whites, and the batter was baked according to instructions. The resulting cake was overly tender and easily broke apart when handled.

A second batter was prepared from the same commercial cake mix wherein the omitted egg-white protein was replaced by 6 g. of partially deamidated gliadin plus 0.35 g. of ammonium peroxydisulfate. When this batter was baked, the resultant cake had a greatly improved firmness and uniform texture.

Example XXXIV

A commercial household pancake mix which required the addition of egg-white ("Duncan Hines") was prepared without adding the egg-white. The pancakes obtained with this batter were of very low volume, flat structure, and were "doughy." When the omitted egg-white was replaced in a second batter by an alkali-hydrolyzed soybean protein and peroxydisulfate anion in the ratio of 0.08 part by weight of anion for each part by weight of soybean protein, products were obtained which resembled a normal egg white-containing pancake in volume, aerated structure, and crust color and appearance.

Another example of the utility of the composition and process of the instant invention lies in the field of adhesives. Heat-set adhesive is prepared by dispersing 10 parts of deamidated gliadin in water and adding 2 g. of potassium peroxydisulfate. This adhesive is then used to coat one surface of each of two pieces of wood, the pieces of wood are clamped together with their coated surfaces in a contiguous relationship, and the assemblage is maintained at 95° C. for one-half hour. After cooling the clamp is removed and the two pieces of wood are found to be bonded together in a waterproof joint.

As used above, the adhesive is a rather thin, nonviscous liquid, and it may be difficult to handle in some applications. A thicker, more viscous liquid can be obtained by heating the adhesive at, say, 80° C. for a few minutes. Such a treatment will render the adhesive less fluid and facilitate the step of spreading it on the surfaces to be joined, while still retaining the heat-setting characteristics.

The foregoing specific examples will serve to illustrate the practice of this invention and will doubtless suggest to those skilled in the art innumerable other variations of and uses for the processes and products of this invention.

The invention having been described in a clear and concise manner and examples of its use having been set forth hereinabove, what is claimed is:

1. A composition of matter consisting essentially of an aqueous medium having a pH between about 2 and about 12 containing (1) a colloidal dispersion of at least about 3% non-heat-gelable protein and (2) water-soluble peroxydisulfate salt in an amount of from 0.035 to about 0.4 part for each part of said protein.

2. A composition of matter consisting essentially of an aqueous medium having a pH between about 2 and about 12 containing (1) a colloidal dispersion of at least about 3% non-heat-gelable protein and (2) water soluble peroxydisulfate salt in an amount of from 0.07 to about 0.15 part for each part of said protein.

3. The composition of matter of claim 2 in which the cation of the water-soluble peroxydisulfate salt is at least one member of the group consisting of alkali-metal and ammonium cations.

4. A method of producing an irreversible heat-set gel which comprises combining in an aqueous medium having a pH between about 2 and about 12 (1) a colloidal dispersion of at least about 3% non-heat-gelable protein and (2) water-soluble peroxydisulfate anion in an amount of from 0.035 to about 0.4 part for each part of said protein; and heating the protein- and salt-containing aqueous medium to a temperature in the range of from about 60° C. to about 150° C.

5. As a composition of matter, the irreversible gel produced by the method of claim 4.

6. A method of producing an irreversible heat-set gel which comprises preparing an aqueous medium having a pH between about 2 and about 12 which contains (1) a colloidal dispersion of from about 3% to about 10% of a non-heat-gelable protein and (2) water-soluble peroxydisulfate salt in an amount of from about 0.07 to about 0.15 part for each part of said protein; and heating the protein- and salt-containing medium to a temperature in the range of from about 90° C. to about 100° C.

7. The method of claim 6 in which the cation of the water-soluble peroxydisulfate salt is at least one member of the group consisting of alkali-metal and ammonium cations.

8. The composition of matter of claim 1 in which the cation of the water-soluble peroxydisulfate salt is at least one member of the group consisting of alkali-metal and ammonium cations.

No references cited.

SAMUEL H. BLECH, *Primary Examiner.*

WILLIAM H. SHORT, *Examiner.*

H. SCHAIN, *Assistant Examiner.*